United States Patent [19]
Sawai et al.

[11] Patent Number: 6,021,018
[45] Date of Patent: Feb. 1, 2000

[54] LOADING MECHANISM FOR A VIDEO CASSETTE

[75] Inventors: Kunio Sawai; Hiroshi Hamahata; Shigeru Kaneko; Katsunori Onishi, all of Osaka, Japan

[73] Assignee: Funai Electric Co., Ltd., Osaka, Japan

[21] Appl. No.: 09/008,174

[22] Filed: Jan. 16, 1998

[30] Foreign Application Priority Data

Jan. 17, 1997 [JP] Japan ................................. 9-000136

[51] Int. Cl.[7] ............................................. G11B 5/008
[52] U.S. Cl. ............................................. 360/96.5
[58] Field of Search .................... 360/96.5, 96.6; 242/338.4, 339

[56] References Cited

U.S. PATENT DOCUMENTS

| | | | |
|---|---|---|---|
| 4,795,109 | 1/1989 | Chung et al. | 360/96.5 |
| 5,060,094 | 10/1991 | Chung et al. | 360/96.5 |
| 5,062,015 | 10/1991 | Maeng | 360/96.5 |

FOREIGN PATENT DOCUMENTS

| | | |
|---|---|---|
| 5-314606 | 11/1993 | Japan . |
| 6-243561 | 9/1994 | Japan . |
| 3039631 | 5/1997 | Japan . |

*Primary Examiner*—David D. Davis
*Attorney, Agent, or Firm*—Lackenbach Siegel Marzullo Aronson & Greenspan, P.C.

[57] ABSTRACT

A loading mechanism in a video cassette deck comprising a cassette moving mechanism 100 for moving a cassette receiving portion 200 between an initial location and a running location. The cassette moving mechanism 100 has a slide arm 120 horizontally slidably attached on one of a pair of wall portions 110 provided on both left and right sides of the cassette receiving portion 200, a driving portion for sliding the slide arm 120, a cassette driving gear 130 which is rotatably supported on the wall portion 110 to which the slide arm 120 is attached and which is connected to the cassette receiving portion 200 through a groove portion 112 formed in the wall portion 110, and a door arm 140 for transmitting the motion of the slide arm 120 to a door. The cassette loading mechanism is designed so that the door is opened before the cassette receiving portion 200 is moved when the cassette receiving portion 200 in the running location is moved into the initial location.

4 Claims, 7 Drawing Sheets

LOADING MECHANISM FOR A VIDEO CASSETTE

BACKGROUND OF THE INVENTION

The present invention relates to a loading mechanism in a video cassette deck.

A conventional loading mechanism in a video cassette deck has a door for opening/closing a cassette insertion port provided in the front of a deck body, a cassette receiving portion movable between an initial location facing the cassette insertion port and a running location where a video cassette tape is made to run, and a cassette moving mechanism for moving the cassette receiving portion between the initial location and the running location.

The cassette moving mechanism has a pair of wall portions provided on both left and right sides of the cassette receiving portion, a slide arm attached on one of these wall portions horizontally slidably, a driving portion for sliding the slide arm, a cassette driving gear which is rotatably supported on the wall portion on which the slide arm is attached and which is connected to the cassette receiving portion through a groove portion formed in the wall portion, and a door arm for transmitting the motion of the slide arm to the door.

When the cassette receiving portion in the running location is moved to the initial location, that is, when a video cassette tape is ejected, the door is opened by using the movement of the cassette receiving portion from the running location to the initial location.

The running location of the cassette receiving portion is deeper and lower than the initial location. It is therefore necessary to first move up the cassette receiving portion when the cassette receiving portion is to be moved from the running location to the initial location. The rotation of the cassette driving gear for moving up the cassette receiving portion is transmitted to the door arm to thereby make the door open. Then, the door is opened toward the inside.

The above-mentioned conventional loading mechanism in a video cassette deck has, however, the following problem.

That is, since two operations, that is, moving up the cassette receiving portion in the running location and opening the door toward the inside are performed at the same time, it is required to provide a horizontal gap G between an opening fulcrum 521 of a door 520 and a front edge portion of a video cassette tape 400 such that the gap G has at least a height corresponding to the height of the door, as shown in FIG. 7, so that the video cassette tape 400 set in the cassette receiving portion and the door 520 located in the middle of opening operation should not interfere with each other.

It is therefore necessary to move the video cassette tape horizontally from the initial location at least to the extent of a depth corresponding to the depth of the video cassette tape.

On the other hand, recently, video cassette decks have been miniaturized by reconsidering the arrangement of parts and the mechanisms of respective portions, but it is required to provide a depth corresponding to the horizontal movement of a vide cassette tape for loading. In other words, when the quantity of horizontal movement of a vide cassette tape for loading is reduced, the depth of the video cassette deck can be also reduced.

SUMMARY OF THE INVENTION

Paying attention to this point of view, an object of the present invention is to provide a loading mechanism in a video cassette deck in which the quantity of horizontal movement of a video cassette tape for loading is reduced to thereby reduce the depth of the video cassette deck.

The loading mechanism in a video cassette deck according to the present invention comprises a door for opening and closing a cassette insertion port provided in the front of a deck body, a cassette receiving portion movable between an initial location facing the cassette insertion port and a running location in which a video cassette tape is made to run, and a cassette moving mechanism for moving the cassette receiving portion between the initial location and the running location, the cassette moving mechanism including a pair of wall portions provided on both the left and right sides of the cassette receiving portion, a slide arm attached on one of the wall portions horizontally slidably, a driving portion for making the slide arm slide, a cassette driving gear which is rotatably supported on the one wall portion on which the slide arm is attached and which is connected to the cassette receiving portion through a groove portion formed in the one wall portion, and a door arm for transmitting the motion of the slide arm to the door, the door being opened before the cassette receiving portion is moved when the cassette receiving portion is moved to the initial location.

DETAILED DESCRIPTION OF THE PREFERRED EMBODIMENTS

Figure 1:
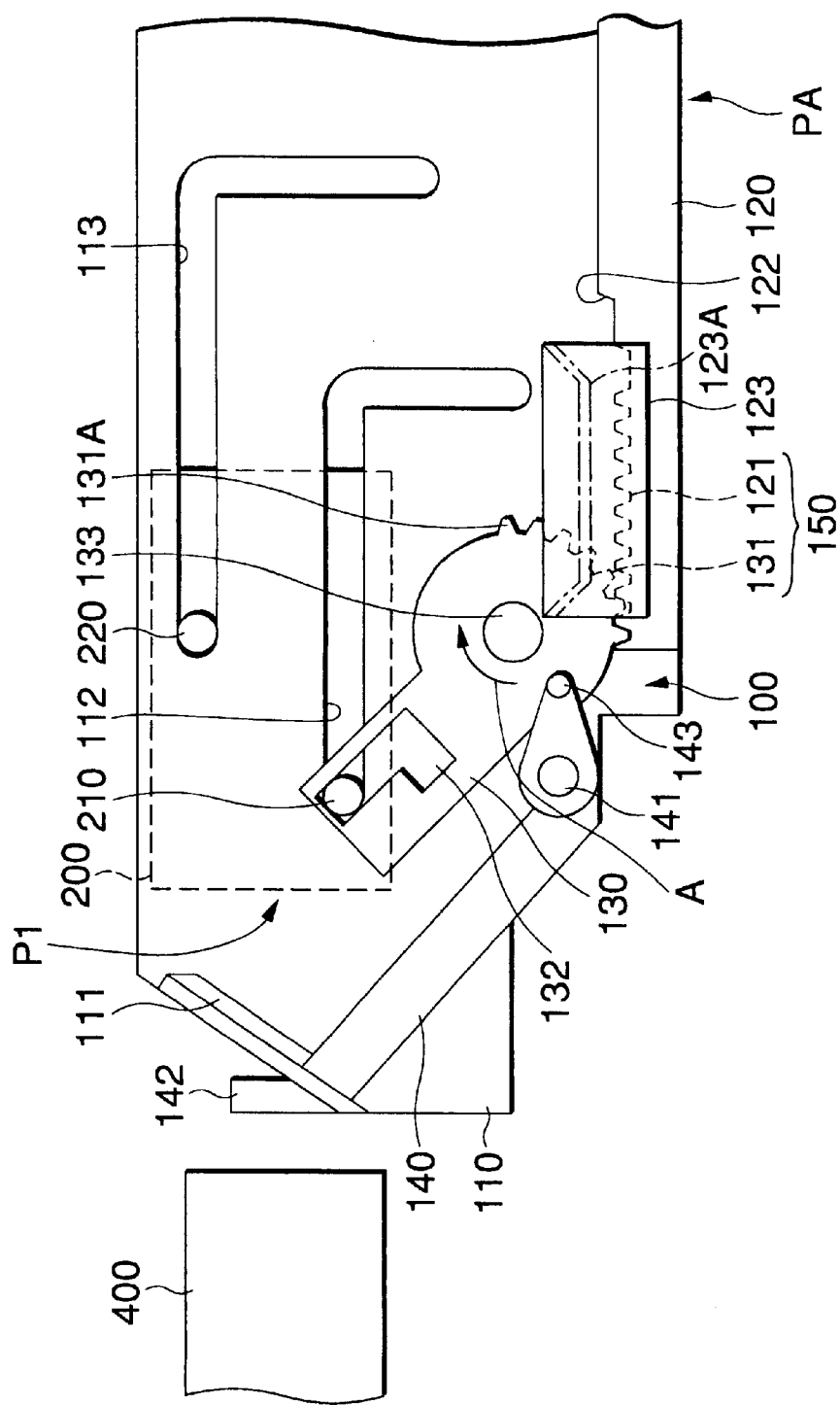
FIG. 1 is a schematic side view of a loading mechanism in a video cassette deck according to an embodiment of the present invention, in which a cassette receiving portion is in an initial location.
Figure 2:
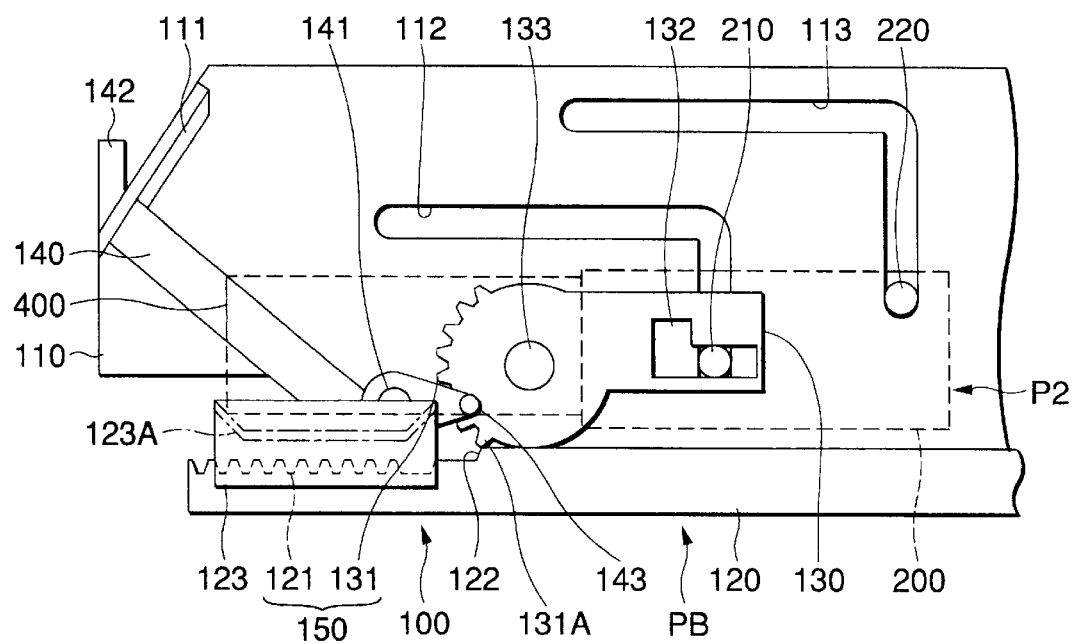
FIG. 2 is a schematic side view of the loading mechanism in a video cassette deck according to the embodiment of the present invention, in which the cassette receiving portion is in a running location.
Figure 3:
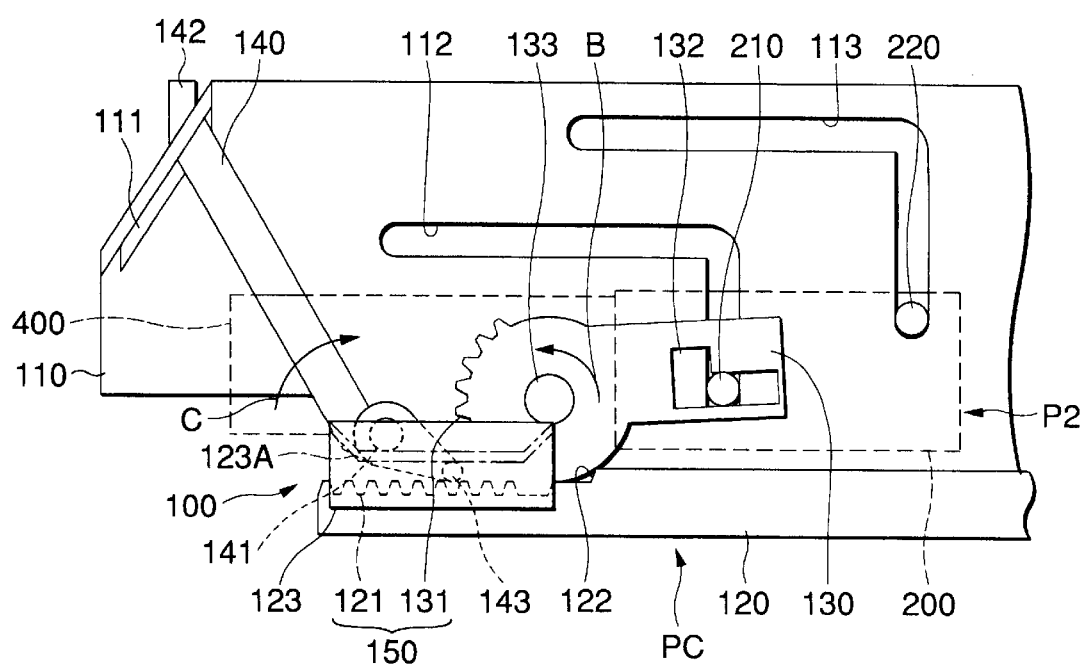
FIG. 3 is a schematic side view of the loading mechanism in a video cassette deck according to the embodiment of the present invention, in which a slide arm is in an eject ready position.
Figure 4:
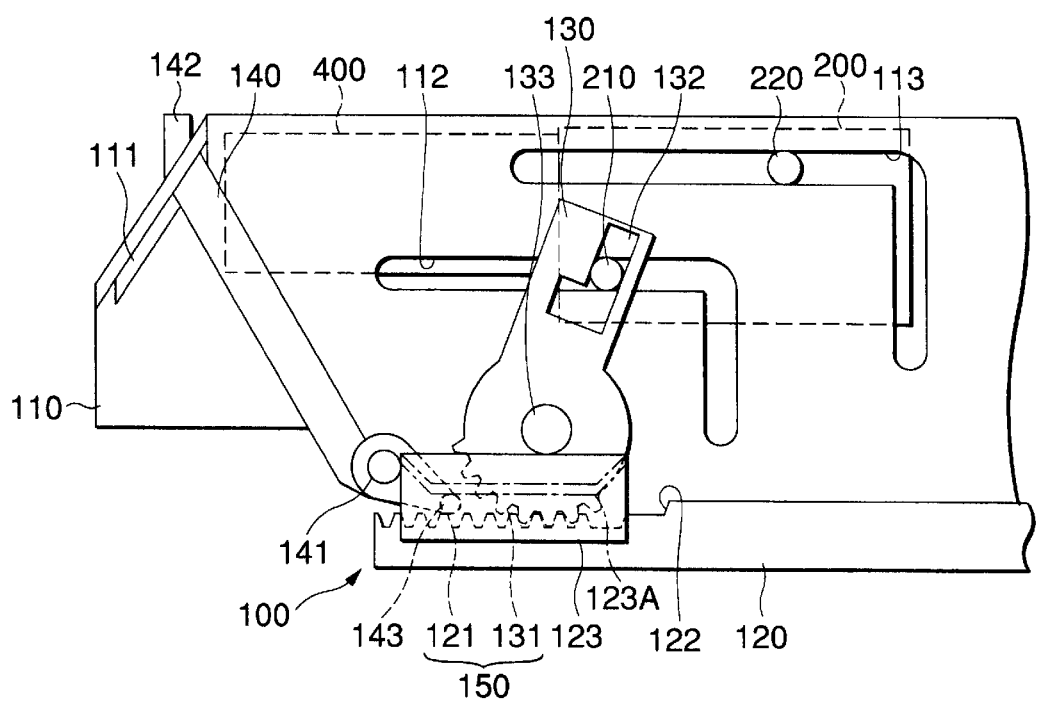
FIG. 4 is a schematic side view of the loading mechanism in a video cassette deck according to the embodiment of the present invention, in which the cassette receiving portion is in a position between the initial location and the running location.
Figure 5:
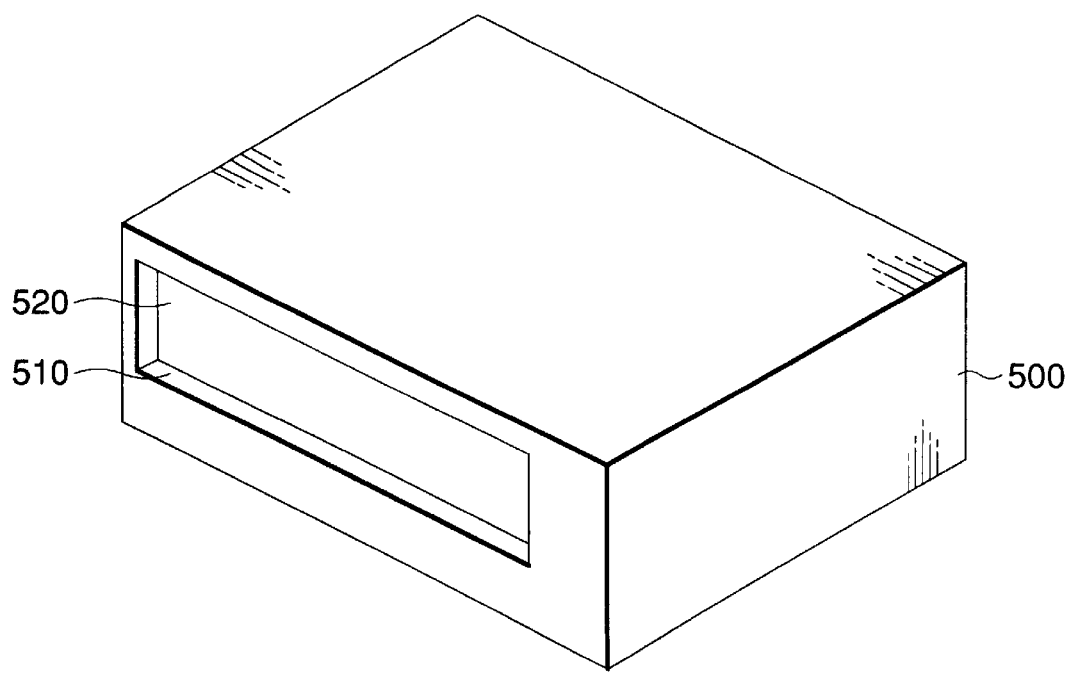
FIG. 5 is a schematic perspective view of a video cassette deck.
Figure 6:
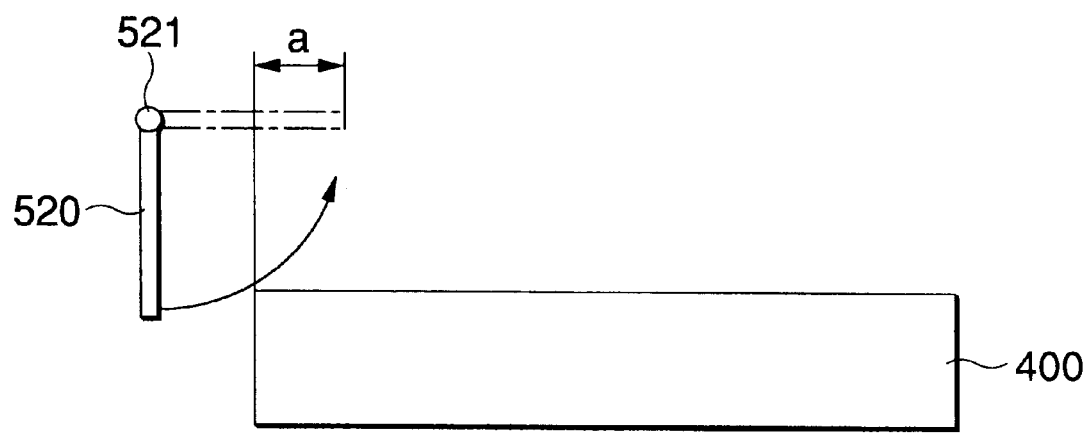
FIG. 6 is a schematic side view showing the effect of the loading mechanism in a video cassette deck according to the embodiment of the present invention.

FIG. 1 is a schematic side view of a loading mechanism in a video cassette deck according to an embodiment of the present invention, in which a cassette receiving portion is in an initial location. FIG. 2 is a schematic side view of the loading mechanism in a video cassette deck according to the embodiment of the present invention, in which the cassette receiving portion is in a running location. FIG. 3 is a schematic side view of the loading mechanism in a video cassette deck according to the embodiment of the present invention, in which a slide arm is in an eject ready position. FIG. 4 is a schematic side view of the loading mechanism in a video cassette deck according to the embodiment of the present invention, in which the cassette receiving portion is in a position between its initial location and the running location. FIG. 5 is a schematic perspective view of a video cassette deck. FIG. 6 is a schematic side view showing the effect of the loading mechanism in a video cassette deck according to the embodiment of the present invention.

A loading mechanism in a video cassette deck according to an embodiment of the present invention has a door 520 for opening/closing a cassette insertion port 510 provided in the front of a deck body 500, a cassette receiving portion 200 movable between an initial location P1 facing the cassette insertion port 510 and a running location P2 where a video cassette tape 400 is made to run, and a cassette moving mechanism 100 for moving the cassette receiving portion 200 between the initial location P1 and the running location P2. The characteristic of the loading mechanism is in the motion of the door 520 when the video cassette tape 400 in the running location P2 is ejected.

The terms used in this specification will be defined first before the detail description of the configuration of the respective portions. The initial location P1 means a position where the cassette receiving portion 200 faces the cassette insertion port 510, that is, a position where the cassette receiving portion 200 is located in the case where the video cassette tape 400 has not been loaded. In addition, the running location P2 means a position where the cassette receiving portion 200 is located in the case where reproducing, recording, etc. are performed on the video cassette tape 400.

On the other hand, the position of the slide arm 120 in the case where the cassette receiving portion 200 is in the running location P2 is referred to as a running position PB. In addition, the position of the slide arm 120 in the case where the cassette receiving portion 200 is in the initial location P1 is referred to as an initial position PA. Further, the position of the slide arm 120 in the case where the cassette receiving portion 200 is in the running location P2 and the door 520 is to be opened is referred to as an eject ready position PC.

First, the cassette insertion port 510 elongated from side to side for insertion and ejection of the video cassette tape 400 is open in the front of the deck body 500. In order to prevent dust from entering the inside, the cassette insertion port 510 is normally closed by the door 520 except when the video cassette tape 400 is inserted or ejected. This door 620 can be opened toward the upper of the inside around shafts (not-shown) formed on the opposite corner portions at the upper end. A door-side nail portion (not-shown) for catching the door arm 140 which will be described later is formed on an end portion of the back of the door 520. Since an arm-side nail portion 142 of the door arm 140 is caught by the door-side nail portion, the door 520 is opened/closed in accordance with the motion of the door arm 140.

In addition, the cassette receiving portion 200 into which the video cassette tape 400 will be loaded has a bottom plate, side plates provided to stand on the left and right sides of the bottom plate, a shaft laid between the side plates, and pinions 220 attached on the opposite ends of this shaft. The cassette receiving portion 200 can move between the initial location P1 where the cassette insertion port 510 faces and the running location P2 where the video cassette tape 400 is made to run.

Further, the cassette moving mechanism 100 for moving the cassette receiving portion 200 between the initial location P1 and the running location P2 has a pair of wall portions 110 provided on both left and right sides of the cassette receiving portion 200, a slide arm 120 attached on one of the wall portions 110 horizontally slidably, a driving portion (not-shown) for sliding this slide arm 120, a cassette driving gear 130 which is rotatably supported on the wall portion 110 on which the slide arm 120 is attached and which is connected to the cassette receiving portion 200 through a groove portion 112 formed in the wall portion 110, and a door arm 140 for transmitting the motion of the slide arm 120 to the door 520.

The pinion 220 of the cassette receiving portion 200 gears with gears of geared groove portions 113 formed in the above-mentioned pair of wall portions 110 respectively. These geared groove portions 113 are extended horizontally from the initial location P1 toward the deep side, bent by 90 degrees in the running location P2, and extended downward therefrom. Therefore, in the case where the cassette receiving portion 200 is to move from the initial location P1 to the running location P2, the cassette receiving portion 200 moves from the initial location P1 toward the deep side, and then goes down toward the running location when the cassette receiving portion 200 reaches the running location P2. Although in each of these geared groove portions 113, one gear is formed at the upper edge portion of the horizontal portion while another gear is formed on the right side in the vertical portion in the drawing, the gears being not shown in the drawings.

On the other hand, another groove portion 112 is formed in the wall portion 110. This groove portion 112 is shaped similarly to the geared groove portion 113, and positioned on this side and lower side of the geared groove portion 113. This groove portion 112 is made parallel with the geared groove portion 113 at the portions corresponding to the groove portion 113.

In addition, the slide arm 120 constituting the cassette moving mechanism 100 is attached horizontally slidably on one of the wall portions 110. This slide arm 120 is a member for managing almost all of the operations of this loading mechanism in a video cassette deck, and it is made to slide by a driving portion (not-shown). A predetermined rack portion 121 is formed in the front end portion of the slide arm 120. This rack portion 121 meshes with the pinion portion 131 of the cassette driving gear 130, which will be described later, so as to constitute a gear mechanism 150 for transmitting the respective motions of the side arm 120 and the cassette driving gear 130 to each other. In addition, a lock portion 122 is formed on the slide arm 120 at a position deeper than the rack portion 121 so that a tooth portion 131A disposed on the deepest side of the rack portion 131 is caught by the lock portion 122 when the slide arm 120 is in the running position PB.

Further, a cam plate 123 in which a cam 123A for managing the motion of the door arm 140 is provided inside is formed in a side surface portion on the front end side of this slide arm 120. The cam 123A formed in this cam plate 123 is to move the door arm 140 between an open position to open the door 520 and a close position to close the door 520. Further, the case 123A is formed in a valley-like shape so that its center portion is made low and its opposite ends are made high, as shown in FIGS. 1 to 4 by means of dash chain line.

The door arm 140 the motion of which is managed by this cam 123A is rotatably supported through a fulcrum 141 on the wall portion 110 on which the slide arm 140 is attached. On the front end of this door arm 140, an arm-side nail portion 142 is provided so as to extend laterally to be caught by the door-side nail portion of the door 520.

In addition, on the base end side of this door arm 140 (in the view from the fulcrum 141, the opposite side to the side where the arm-side nail portion 142 is provided), a pin 143 as a cam follower corresponding to the cam 123A projects toward the outside. This pin 143 plays a role to transmit the motion of the slide arm 120 to the door arm 140. The front end side of this door arm 140 enters a slit 111 formed in the wall portion 110 so that the motion of the door arm 140 is guided by this slit 111.

The cassette driving gear 130 is rotatably supported on the wall portion 110 on which the slide arm 120 is attached, and connected to the cassette receiving portion 200 through the groove portion 112 formed in the wall portion 110. The connection between the cassette driving gear 130 and the cassette receiving portion 200 is attained by the engagement of the pin 210 which projects from the side plate of the cassette receiving portion 200 toward the outside, with an approximately L-shaped engagement groove 132 which is provided in the cassette driving gear 130. Accordingly, the rotation of the cassette driving gear 130 is transmitted to the cassette receiving portion 200 through the pin 210, so that the cassette receiving portion 200 moves under the guidance of the groove portion 112.

The pinion portion 131 with its rotation center 133 is formed in the cassette driving gear 130. The pinion portion 131 gears with the rack portion 121 of the slide arm 120 so as to constitute a gear mechanism 150, as mentioned above.

In addition, the gear mechanism 150 has such a feature as follows. First, when the slide arm 120 has advanced toward the front of the deck body 500, that is, when the cassette receiving portion 200 is in the running location P2, that is, when the slide arm 120 is in the running position PB, the pinion portion 131 and the rack portion 121 do not mesh with each other.

Next, the operation and effect of the thus configured loading mechanism in a video cassette deck will be described.

First, the operation of the cassette receiving portion 200 from the initial location P1 to the running location P2 will be described. When the cassette receiving portion 200 is in the initial location P1, the cassette moving mechanism 100 is in such a state as shown in FIG. 1. That is, the slide arm 120 is disposed in the deepest side of the deck body 500, and the pinion portion 131 of the cassette driving gear 130 constituting the gear mechanism 150 gears with the front end portion of the rack portion 121 of the slide arm 120. That is, the slide arm 120 is in the initial position PA.

In addition, the pin 143 of the door arm 140 is not in contact with the cam 123A because the slide arm 120 is on the deepest side. Accordingly, the cassette insertion port 510 is closed by the door 520. However, since the door arm 140 is in a free state, the door 520 can be opened naturally under an external force.

The video cassette tape 400 is loaded into the cassette receiving portion 200 which is in the initial location P1. That is, the video cassette tape 400 is inserted into the inside through the cassette insertion port 510 while pushing the door 520. Then, a switch inwardly and out of the way (not-shown) is turned on by the video cassette tape 400. As a result, a driving mechanism (not-shown) constituting the cassette moving mechanism 100 starts driving, so that the slide arm 120 starts sliding to this side. That is, the slide arm 120 starts to move to the running position PB (see FIG. 4).

By the insertion of the video cassette tape 400 into the cassette receiving portion 200, a lock mechanism (not-shown) is released from locking the cassette receiving portion 200 in the initial location P1.

By the sliding of the slide arm 120 to this side, the cassette driving gear 130 starts to rotate in the direction of arrow A shown in FIG. 1. By this rotation, the cassette receiving portion 200 receives a force from the driving portion, and starts to move from the initial location P1 toward the running location P2. This movement of the cassette receiving portion 200 is guided by the geared groove portion 113 and the groove portion 112. Having reached a position above the running location P2, the cassette receiving portion 200 moved down toward the running location P2.

As shown in FIG. 4, the pin 143 of the door arm 140 slips under the cam 123A immediately before the cassette receiving portion 200 reaches above the running location P2. That is, the sliding movement of the slide arm 120 is transmitted to the door arm 140 by the cam 123A. In this state, the door 520 continues its opened state because the pin 143 of the door arm 140 is located under the cam 123A.

The slide arm 120 continues to slide to this side so that the cassette receiving portion 200 moves to the running location P2. Even if the cassette receiving portion 200 reaches the running location P2, the slide arm 120 continues to move to this side as shown in FIG. 3. That is, the slide arm 120 continues to slide to this side till the pin 143 comes off from the cam 123A.

If the pin 143 comes off from the cam 123A as shown in FIG. 2, the door arm 140 becomes free. Accordingly, the door 520 closes the cassette insertion port 510 spontaneously by its own weight.

That is, the pin 143 comes off from the cam 123A as shown in FIG. 2, and then the rack portion 121 of the slide arm 120 and the pinion portion 131 of the cassette driving gear 130, which constitute the gear mechanism 150, are released from gearing with each other. In addition, the tooth portion 131A on the deepest side of the pinion portion 131 is caught by the lock portion 122 formed in the slide arm 120. Consequently, the cassette receiving portion 200 reaches the running location P2, and the slide arm 120 arrives at the running position PB.

Next, the operation of the cassette receiving portion 200 from the running location P2 to the initial location P1 will be described.

When the cassette receiving portion 200 is in the running location P2, the respective portions of the cassette moving mechanism 100 are in such a state as shown in FIG. 2. When a cassette eject switch (not shown) is operated in this state, a driving portion (not-shown) constituting the cassette moving mechanism 100 is driven in the opposite direction to the previous direction. By the driving of this driving portion, the slide arm 120 in the running position PB slides to the initial position PA through the eject ready position PC. That is, in the view from the cassette receiving portion 200, the cassette receiving portion 200 in the running location P2 moves to the initial location P1.

When the slide arm 120 in the running position PB starts to slide to the deeper side, the cassette driving gear 130 does not rotate because the pinion portion 131 does not mesh with the rack portion 121 of the slide arm 120. That is, the cassette receiving portion 200 is left P2 as it is in the running location P2.

However, since the pin 143 of the door arm 140 slips under the cam 123A as the slide arm 120 slides to the deeper side, the door arm 140 rotates in the direction of arrow C as shown in FIG. 3 around the fulcrum 141 so that the door 520 is forcibly opened. That is, the slide arm 120 has slid from the running position PB to the eject ready position PC.

When the door 520 has been fully opened, the rack portion 121 and the pinion portion 131, which constitute the mesh mechanism 150, gear with each other for the first time. By this gear mechanism, the cassette driving gear 130 is rotated in the direction of arrow B as shown in FIG. 3 so that the cassette receiving portion 200 moves up from the running location P2 along the geared groove portion 113 and the groove portion 112. In this state, the door 520 is in a fully opened state.

Then, the slide arm 120 continues to slide to the further deeper side via the state shown in FIG. 4 so that the cassette receiving portion 200 reaches the initial location P1.

In the initial location P1 (see FIG. 1), the pin 143 of the door arm 140 and the cam 123A are not in contact with each other. That is, since the door arm 140 is in a free state, the door arm 140 abuts against the upper surface of the video cassette tape 400 to thereby keep the opened state. Therefore, when the video cassette tape 400 is ejected from the cassette receiving portion 200, the door 520 closes the cassette insertion port 510 spontaneously by its own weight.

The loading mechanism in a video cassette deck according to the present invention comprises a door for opening and closing a cassette insertion port provided in the front of a deck body, a cassette receiving portion movable between an initial location facing the cassette insertion port and a running location in which a video cassette tape is made to run, and a cassette moving mechanism for moving the cassette receiving portion between the initial location and the running location, the cassette moving mechanism including a pair of wall portions provided on both the left and right sides of the cassette receiving portion, a slide arm attached on one of the wall portions horizontally slidably, a driving portion for making the slide arm slide, a cassette driving gear which is rotatably supported on the one wall portion on which the slide arm is attached and which is connected to the cassette receiving portion through a groove portion formed in the one wall portion, and a door arm for transmitting the motion of the slide arm to the door; the door being opened before the cassette receiving portion is moved when the cassette receiving portion is moved to the initial location, and is characterized in that when it is defined so that the slide arm is in a running position in the case where the cassette receiving portion is in the running location, the slide arm is in its initial position in the case where the cassette receiving portion is in the initial location, and the slide arm is in its eject ready position in the case where the cassette receiving portion is in the running location and the door is opened, the slide arm and the cassette driving gear have a gear mechanism for transmitting the motion of each of the slide arm and the cassette driving gear to each other, and the gear mechanism starts to move the cassette receiving portion from the running location toward the initial location after the slide arm has moved from the running position to the eject ready position.

Figure 7:
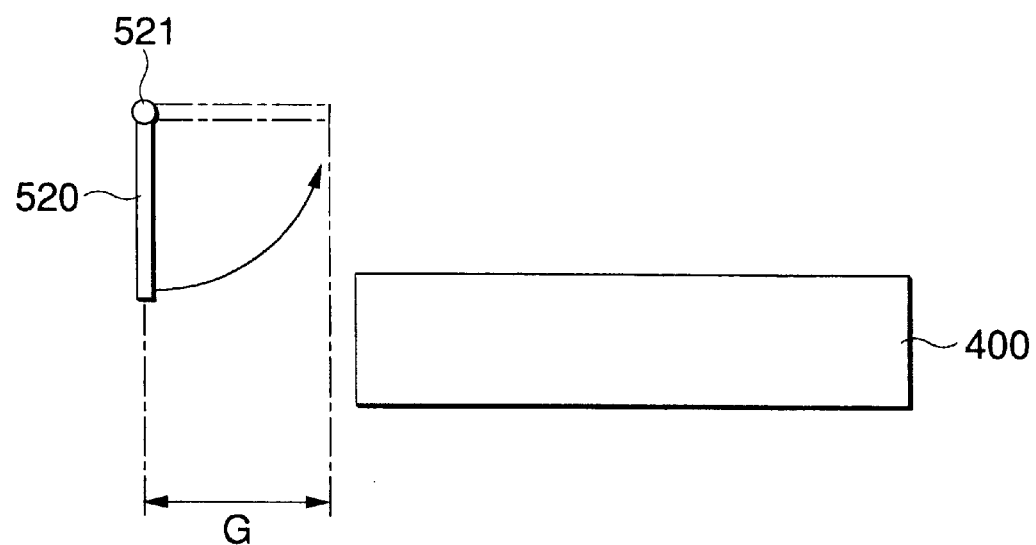
FIG. 7 is a schematic side view showing problems of a loading mechanism in a video cassette deck of the conventional type.

Accordingly, in this loading mechanism in a video cassette deck, when the video cassette tape in the running location is ejected, the door is opened before the cassette receiving portion, that is, the video cassette tape starts to be returned to the initial location. Accordingly, even if the door is made close to the running location, there is no fear that the operation of opening the door and the operation of returning the video cassette tape from the running location to the initial location interfere with each other. Specifically, as shown in FIG. 6, since the video cassette tape 400 and the door 520 in the middle of the opening operation do not interfere with each other, it is not necessary to provide a horizontal gap G between the opening fulcrum 521 of the door 520 and the front edge portion of the video cassette tape 400 so as to have a height corresponding to the height of the door 520, as shown in the conventional mechanism of FIG. 7. Accordingly, it is possible to reduce the horizontal movement of the video cassette tape by an amount corresponding to a value a shown in FIG. 6. Accordingly, it is possible to reduce the depth of the video cassette deck at least by the amount corresponding to the value a shown in FIG. 6, in comparison with the depth of the conventional video cassette tape.

Furthermore, according to the loading mechanism in a video cassette deck as stated, the slide arm is provided with a cam for moving the door arm between an open position to open the door and a close position to close the door, so that the cam moves the door arm from the close position to the open position while the slide arm slides from the running position to the eject ready position. By such a configuration, the door can be opened while the cassette receiving portion is left as it is in the running location.

Further, in the loading mechanism in a video cassette deck, the gear mechanism is constituted by a rack portion formed in the slide arm, and a pinion portion formed in the cassette driving gear so as to gear with the rack portion, and the rack portion and the pinion portion do not gear with each other when the slide arm is in a position between the running position and the eject ready position. It is therefore possible to keep the cassette receiving portion in the running location surely when the slide arm is in a position between the running position and the eject ready position.

What is claimed is:

1. A loading mechanism for loading a video cassette into a play position in a video cassette deck comprising:

a door having an opening for receiving said video cassette;

a cassette holder, for holding said video cassette at an initial position, and for moving said video cassette between said initial position and a play position while holding said video cassette;

a slide arm capable of sliding in parallel to an insertion direction of said video cassette;

a holder drive gear for driving said cassette holder via a gear mechanism so said cassette holder is positioned in the initial position when said slide arm is positioned at a first position, and is positioned in said play position when said slide arm is positioned at a second position; and a door arm for driving said door in accordance with movement of said slide arm, so that when said slide arm slides from said second position toward said first position, said door arm opens said door while said slide arm slides from the first position towards a third position which is arranged between said first and second positions, and said holder drive gear starts to drive said cassette holder from said play position towards said initial position after said slide arm passes said third position so that said door is opened befor said cassete holder is moved when said cassette holder is moved to said initial position.

2. The loading mechanism as set forth in claim 1, wherein said slide arm includes a cam mechanism for driving said door arm between an open position at which said door is opened and a closed position at which said door is closed, and said cam mechanism driving said door arm from said closed position toward said opened position while said slide arm slides from said second position toward said third position.

3. The loading mechanism as set forth in claim 1, wherein said gear mechanism includes a rack portion formed on said slide arm and a pinion portion formed on said holder drive gear to engage with said rack portion, and said rack portion and said pinion portion being disengaged while said slide arm is positioned between said second and said third positions.

4. The loading mechanism as set forth in claim 2, wherein said gear mechanism includes a rack portion formed on said slide arm and a pinion portion formed on said holder drive gear to engage with said rack portion, and said rack portion and said pinion portion are disengaged while said slide arm is positioned between said second and said third positions.

* * * * *

UNITED STATES PATENT AND TRADEMARK OFFICE
CERTIFICATE OF CORRECTION

PATENT NO.   : 6,021,018
DATED        : February 1, 2000
INVENTOR(S)  : Sawai et al.

It is certified that error appears in the above-identified patent and that said Letters Patent is hereby corrected as shown below:

<u>Column 8,</u>
Line 49, change "first" to -- second --.
Line 54, change "befor" to -- before --.
Line 54, change "cassete" to -- cassette --.

Signed and Sealed this

Ninth Day of July, 2002

*Attest:*

*Attesting Officer*

JAMES E. ROGAN
*Director of the United States Patent and Trademark Office*

(12) EX PARTE REEXAMINATION CERTIFICATE (7652nd)
United States Patent
Sawai et al.

(10) Number: US 6,021,018 C1
(45) Certificate Issued: Aug. 3, 2010

(54) LOADING MECHANISM FOR LOADING A VIDEO CASSETTE

(75) Inventors: Kunio Sawai, Osaka (JP); Hiroshi Hamahata, Osaka (JP); Shigeru Kaneko, Osaka (JP); Katsunori Onishi, Osaka (JP)

(73) Assignee: Funai Electric Co., Ltd., Daito-shi Osaka (JP)

Reexamination Request:
No. 90/009,399, Mar. 17, 2009

Reexamination Certificate for:
Patent No.: 6,021,018
Issued: Feb. 1, 2000
Appl. No.: 09/008,174
Filed: Jan. 16, 1998

Certificate of Correction issued Jul. 9, 2002.

(30) Foreign Application Priority Data

Jan. 17, 1997 (JP) ............................................. 9-000136

(51) Int. Cl.
*G09B 15/111* (2006.01)

(52) U.S. Cl. .................................................. 360/96.51
(58) Field of Classification Search ................. 360/96.51
See application file for complete search history.

(56) References Cited

FOREIGN PATENT DOCUMENTS

| JP | 5-314606 | 11/1993 |
|----|----------|---------|
| JP | H05-314606 | 11/1993 |
| JP | H06-243561 | 9/1994 |
| JP | 6-243561 | 9/1994 |
| JP | 7-72967 | 8/1995 |
| JP | H7-254195 | 10/1995 |
| JP | S63-317999 | 12/1998 |
| KR | 1992-0002912 | 4/1994 |
| KR | 1994-0002912 | 4/1994 |

*Primary Examiner*—Minh T Nguyen

(57) ABSTRACT

A loading mechanism in a video cassette deck comprising a cassette moving mechanism 100 for moving a cassette receiving portion 200 between an initial location and a running location. The cassette moving mechanism 100 has a slide arm 120 horizontally slidably attached on one of a pair of wall portions 110 provided on both left and right sides of the cassette receiving portion 200, a driving portion for sliding the slide arm 120, a cassette driving gear 130 which is rotatably supported on the wall portion 110 to which the slide arm 120 is attached and which is connected to the cassette receiving portion 200 through a groove portion 112 formed in the wall portion 110, and a door arm 140 for transmitting the motion of the slide arm 120 to a door. The cassette loading mechanism is designed so that the door is opened before the cassette receiving portion 200 is moved when the cassette receiving portion 200 in the running location is moved into the initial location.

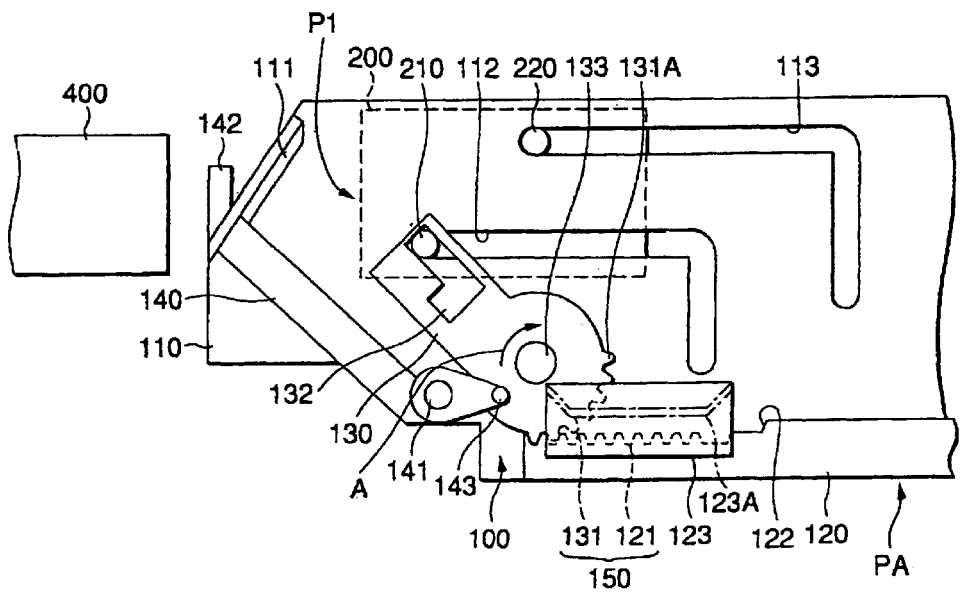

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *